(12) United States Patent
Knowles et al.

(10) Patent No.: US 8,716,880 B2
(45) Date of Patent: May 6, 2014

(54) METHOD AND SYSTEM FOR FLUID WAVE ENERGY CONVERSION

(76) Inventors: Gareth J. Knowles, Williamsport, PA (US); Ross Bird, Canton, PA (US)

( * ) Notice: Subject to any disclaimer, the term of this patent is extended or adjusted under 35 U.S.C. 154(b) by 451 days.

(21) Appl. No.: 13/145,891

(22) PCT Filed: Jan. 22, 2010

(86) PCT No.: PCT/US2010/021862
§ 371 (c)(1),
(2), (4) Date: Jul. 22, 2011

(87) PCT Pub. No.: WO2010/085690
PCT Pub. Date: Jul. 29, 2010

(65) Prior Publication Data
US 2011/0278990 A1 Nov. 17, 2011

Related U.S. Application Data

(60) Provisional application No. 61/146,457, filed on Jan. 22, 2009.

(51) Int. Cl.
*F03B 13/10* (2006.01)
(52) U.S. Cl.
USPC .............................................................. 290/53
(58) Field of Classification Search
USPC ......................................... 290/42, 43, 53, 54
See application file for complete search history.

(56) References Cited

U.S. PATENT DOCUMENTS

| | | | | |
|---|---|---|---|---|
| 7,285,868 B2* | 10/2007 | Wilson | ........................... | 290/1 R |
| 7,573,143 B2* | 8/2009 | Frayne | ........................... | 290/1 R |
| 7,633,175 B1* | 12/2009 | Wilson et al. | .................... | 290/43 |
| 7,772,712 B2* | 8/2010 | Frayne | ........................... | 290/1 R |
| 8,415,819 B2* | 4/2013 | Sapir et al. | ....................... | 290/53 |
| 8,519,554 B2* | 8/2013 | Kaplan | ........................... | 290/1 R |
| 2010/0207395 A1* | 8/2010 | Frayne | ........................... | 290/54 |
| 2011/0031749 A1* | 2/2011 | Sapir et al. | ....................... | 290/50 |
| 2013/0127168 A1* | 5/2013 | Dragic | ............................ | 290/53 |

* cited by examiner

*Primary Examiner* — Nicholas Ponomarenko

(57) ABSTRACT

A system for converting kinetic wave energy from a dynamic fluid into electrical power, the system including a structural housing containing a piezokinetic assembly having a plurality of electromechanical coupled elements, and a dynamic assembly, coupled to the piezokinetic assembly; and charge storage devices or power consumption devices in an electronics module coupled to the piezokinetic assembly. When the exposed to the dynamic fluid medium, the dynamic fluid medium's wave energy couples with the structural housing causing a resulting displacement of the dynamic assembly contained therein. The displacement of the dynamic assembly causes a plurality of the electromechanical coupled elements to simultaneously flex, generating an electrical charge which may be either stored in the charge storage device or which may directly power the power consumption device.

37 Claims, 12 Drawing Sheets

METHOD AND SYSTEM FOR FLUID WAVE ENERGY CONVERSION

I. FIELD OF THE INVENTION

This invention relates in general to the field of energy conversion systems and in particular to the field of conversion of fluid wave energy into electrical energy.

II. DESCRIPTION OF THE PRIOR ART

In today's economic and environmental climate it has become increasingly desirable to perfect ways to harvest and convert environmental energy into electrical power that can be used to power electrical devices. This type of energy harvesting, becomes even more important and difficult when the environment is one that involves extremes such as weather and location.

Methods and apparatus for converting environmental energy from dynamic fluids present unique problems while simultaneously offering an almost unlimited potential if one can overcome the challenges that arise from the dynamic fluid environment. Energy harvesting from and application to airborne, fixed or waterborne systems offer unique challenges of materials and design since they must often function in some of the most extreme environments that the planet has to offer. Extremes of temperature, structural stress and weight as well as packaging requirements must be overcome for a design to be viable.

One such extreme environment that offers unique problems is energy conversion for marine or submerged electrical systems that are traditionally battery powered. Generally a drawback of battery power is that the useful life of the battery is limited unless solar energy is used to recharge the batteries. However, when the system is submerged, employed in an environment with limited solar exposure or a dynamic environment, the various approaches are limited.

Energy harvesting approaches that, initially appear viable for energy sourcing and that are compatible with marine environments, e.g., sonar buoy's employed via submarine launch at depth, generally relate to kinetic energy in the form of vibrations, radiation as solar energy, and thermal energy:

Thermal pipes can be integrated along the axial length of a partial or completely underwater system or subsystem in the direction of increasing depth as to use the Seebeck effect to produce electrical power. A problem with this approach is that it completely relies upon the thermal gradient that exists in the sea water over intervening depth of the thermal pipe. However, the temperature-depth ocean water profile (thermocline) generally shows there is little thermal differential over the first 600 meters. This renders thermal approaches very difficult to implement for floating or submerged applications without lengthy cables, which may not be feasible in many, especially shallow water applications.

Solar radiation (light and heat) that hits the ocean is absorbed in the first few tens of meters of water. Waves and turbulence mix this heat downward quickly. This means that a radiation device, such as a solar heat pump, must be located on the water surface (ocean, lake, inlet etc.) As such, it is subject to all the environmental extremes. Another concern is that since solar energy recovery is typically directly proportional to coverage area, a large surface area is needed to provide even small conversion intake. From practical and observability considerations and design reasoning, it would be far more desirable to locate the energy harvesting at the other end of a buoy.

Another energy harvesting method is Kinetic, usually using piezo-coupling mechanisms that generate electrical power via their direct effect. If piezoelectric elements are strained by external force, charge is generated. Much investigation has focused on using the direct effect of piezo-polymers or active piezofiber composites to harvest energy. The art has shown that by using mid-frequency excited piezoceramics, instead of polymers, piezokinetic transduction efficiency can reach 70% as compared with the 16-18% common to solar energy harvesting and enable a 10 fold to nearly 100 fold improvement in energy conversion per unit volume over piezopolymer/copolymer or active piezofiber composites energy harvesting capability.

The problem is that marine environment based excitations are very low, typically only a few Hz to less than a Hz, while resonance of electrostrictive or piezoelectric beams and plates or beams and plates that incorporate piezoelectric or electrostrictive materials or composites are typically at acoustic frequencies of tens to hundreds of Hz.

FIG. 1 shows a wave energy conversion device for terrestrial implementations 100 employing ball strikers. As illustrated in FIG. 1, a slow air environment induced excitation is converted to desired piezomechanical excitation using an inexpensive small ball-piezoceramic bimorph beam. A rotating fan causes the small balls 102 to fall and strike cantilever piezoceramic beams 104 towards it's tip which causes a mid-frequency (ring down) vibratory response in the beams that converts elastic energy to electrical energy. As the fan rotates the ball 102 falls and strikes the beam 104 located below causing that particular beam 104 to vibrate. However as the system continues to rotate the ball 102 will rest on the piezoceramic beams 104' causing a dampening effect on the beam effectively reducing the energy generated by the piezoceramic beams by a significant amount. This dampening effect limits the system's energy output as the design allows only one piezoceramic beam to generate charge at a time. Also a system employing a ball striker method would have significant limitations in a liquid environment. Thus, a method, system and apparatus for harvesting and converting environmental energy into electrical power, in both marine and terrestrial environments that is efficient, scalable, environmentally robust and largely autonomous would be desirable. Such a method, system, and apparatus would be useful in both the commercial and defense sectors.

III. SUMMARY OF THE INVENTION

It is an object of the present invention to provide a method and apparatus which converts a sizeable proportion of the mechanical energy produced by the ocean or tides, either as wave motion or current motion, into mechanical excitation at, or very close to, the resonance frequency of a piezokinetic device.

It is a further object of the invention to provide a method and apparatus to substantially increase the volumetric proportion of electromechanical coupled materials that are being excited at any given moment, at or near resonance, by the converted mechanical energy.

It is another object of the invention to couple and convert relatively low frequency wave energy into electrical energy via the use of piezoelectric coupling at or near piezoelectric resonant frequency.

It is yet a further object of the invention to provide a method and apparatus for converting kinetic energy into electrical energy through the simultaneous excitation of a plurality of electromechanical coupled materials in a single apparatus.

Certain of these and other objects are accomplished in part by a system for converting kinetic wave energy from a dynamic fluid into electrical power including a structural housing containing a piezokinetic assembly having a plurality of piezokinetic elements, panels or members, and a dynamic assembly, coupled to the piezokinetic assembly; and an electronics module coupled to the piezokinetic assembly. When the system operates in a dynamic fluid medium, the dynamic fluid medium's energy (wave or current flow) mechanically couples with the structural housing causing a resulting displacement of the dynamic assembly contained therein. The displacement of the dynamic assembly causes the plurality of electromechanical coupled elements to simultaneously flex, causing an electrical charge to be generated at each individual element because of the direct piezoelectric effect.

Still other objects of the invention are accomplished through an apparatus for converting fluid wave energy to electrical energy including a housing structure having a rotating collar coupled thereto. The rotating collar is disposed around the housing and coupled to the housing such that the collar is free to rotate. The rotating collar includes a plurality of blades, or fins, disposed on its surface. The blades are configured to couple with the surrounding dynamic fluid medium.

The apparatus also includes an interior sleeve structure having a plurality of structural projections on its interior surface, the interior sleeve structure being disposed within the housing and coupled to the rotating collar, such that rotation of the rotating collar drives a corresponding rotation of the interior sleeve. A piezokinetic assembly is disposed inside the interior sleeve structure and has a plurality of piezokinetic elements projecting therefrom, the piezokinetic elements are coupled to an energy storage device. Immersion of the blades of the rotating collar into a dynamic fluid medium couples the rotating collar to the dynamic fluid medium, causing a rotation of the collar and a corresponding rotation of the interior sleeve structure relative to the piezokinetic assembly. The rotation of the interior sleeve structure causes at least one structural projection to couple to the edge of the piezokinetic assembly by engaging and disengaging the edges of the piezokinetic elements of the piezokinetic assembly. The interaction of the structural projection and the piezokinetic elements of the piezokinetic assembly vibrate the piezokinetic elements causing the electromechanical coupled material attached to the piezokinetic elements to generate an electrical charge.

Objects of the invention are further satisfied by an apparatus for converting and storing wave energy including a piezokinetic assembly having a center hub with a plurality of piezokinetic elements projecting therefrom. The piezokinetic assembly is rigidly attached to a second hub through a drive shaft and is adapted to rotate about the axis of the drive shaft. The second hub includes a plurality of blades disposed on its surface that are adapted to couple with a dynamic fluid medium. The apparatus also includes a fixed housing having at least one structural projection on its interior surface, the housing being disposed to surround the piezokinetic assembly. The center hub is disposed substantially at the center of the housing, and the drive shaft and second hub protrude from the housing. When the blades of the second hub are immersed in a dynamic fluid medium, the blades couple the second hub to the dynamic fluid medium, rotating the second hub and driving a corresponding rotation of the piezokinetic assembly. The rotation of the piezokinetic assembly, relative to the housing, causes the edge of the piezokinetic elements to engage and disengage the edge of the at least one structural projection of the housing causing the piezokinetic elements to vibrate causing the electromechanical coupled material to generate an electrical charge.

Still other objects are satisfied by a method of converting kinetic wave energy into electrical energy, including coupling an exterior blade assembly to a dynamic fluid medium wherein the kinetic energy of the dynamic fluid medium rotates the exterior blade assembly. The method also includes coupling the exterior blade assembly to an interior rotating assembly such that the rotation of the exterior blade assembly rotates the interior assembly. The method also includes coupling the interior assembly to a piezokinetic assembly such that the rotation of the interior assembly relative to the piezokinetic assembly, vibrates the piezokinetic elements of the piezokinetic assembly flexing electromechanical coupled material of the piezokinetic element producing an electrical charge.

Still other objects are satisfied by a method of converting kinetic wave energy into electrical energy, including coupling an exterior assembly to a dynamic fluid medium wherein the kinetic energy of the dynamic fluid medium displaces the exterior assembly, and coupling the exterior assembly to an interior assembly such that the displacement of the exterior assembly results in a corresponding displacement of the interior assembly. The method also includes coupling the interior assembly to a piezokinetic assembly such that the movement of the interior assembly relative to the piezokinetic assembly simultaneously flexes a plurality of piezokinetic elements as to cause these individual piezokinetic elements of the piezokinetic assembly to vibrate at or near their individual natural frequency producing an electrical charge.

As used herein "substantially", "generally", and other words of degree, are used as a relative modifier intended to indicate permissible variation from the characteristic so modified. It is not intended to be limited to the absolute value or characteristic which it modifies but rather approaching or approximating such a physical or functional characteristic.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DESCRIPTION OF EMBODIMENTS

Figure 1:
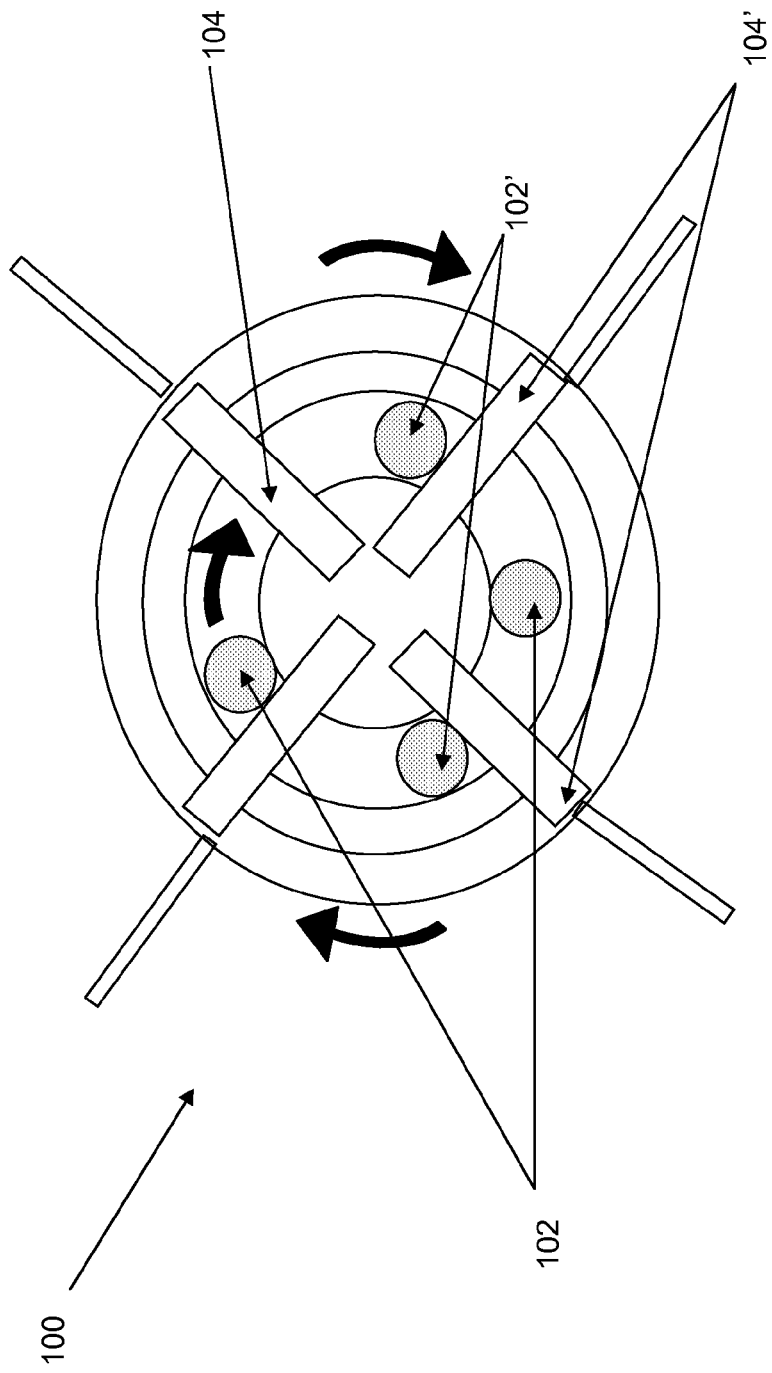
FIG. 1 illustrates a prior art wave energy conversion device employing ball bearing strikers successively acting singly at the tip of progressing individual piezoceramic/metal beam elements arranged in a radial fashion.
Figure 2:
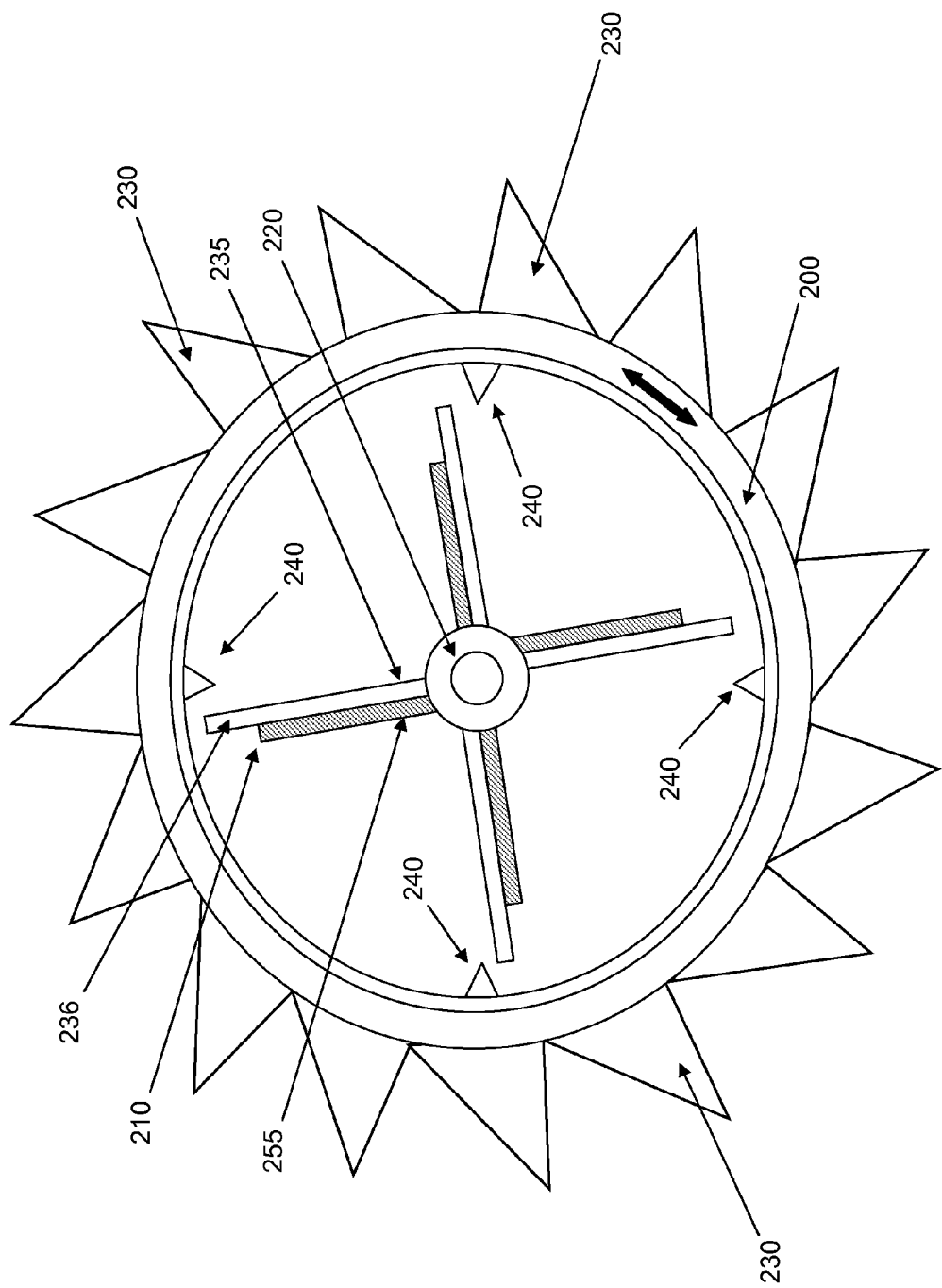
FIG. 2 illustrates an exemplary embodiment of a wave energy conversion apparatus employing a plurality of piezokinetic elements and a plurality of structural projections to simultaneously engage and disengage one or more of the piezokinetic elements arranged radially within the piezokinetic assembly.
Figure 5:
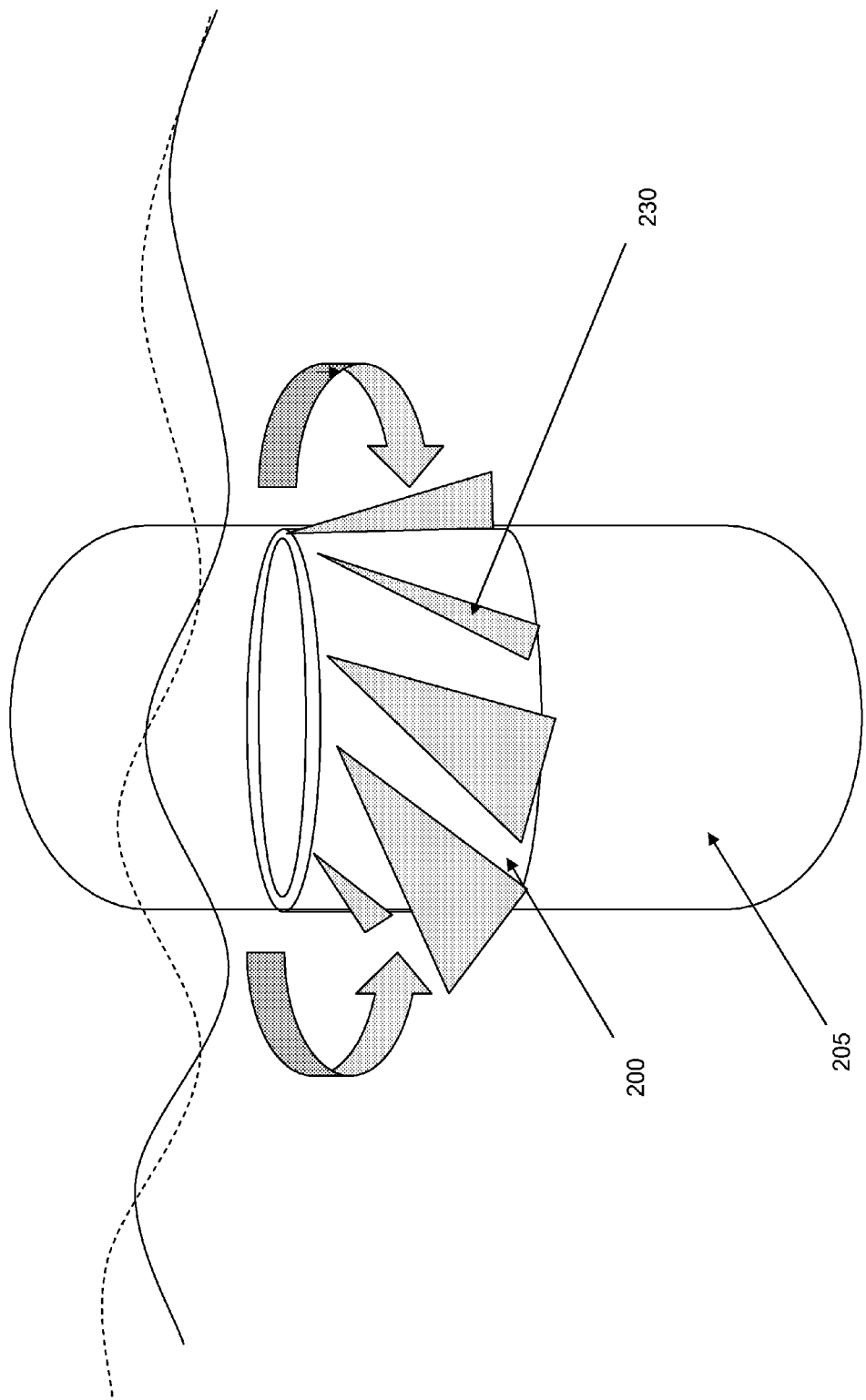
FIG. 5 illustrates an exemplary embodiment of a wave energy conversion device with a structural housing employing a rotating collar assembly.

Referring now to the figures wherein like reference numbers denote like elements, FIG. 2 and FIG. 5 both illustrate embodiments of the wave energy conversion apparatus employing a plurality of piezokinetic elements. The apparatus features a rotating ring or collar 200 having a plurality of turbine or similar blades 230 attached to its outer surface. The blades 230 are disposed at an angle and are configured to couple with, interact with or otherwise be responsive to movement of an external dynamic medium such as a dynamic fluid around the outer surface of the rotating collar 200. The blades 230 of the rotating collar 200 may incorporate a variable pitch angle. A piezokinetic assembly 220 features a plurality of piezokinetic elements 210, attached thereto projecting outward from a center axis. Typically the piezokinetic elements 210 are disposed to form a cantilevered structure or variations thereof, however other configurations of the piezokinetic elements are contemplated and within the scope of the invention.

The inner surface of the rotating collar 200 includes a plurality of structural projections 240, which are disposed such that they engage and subsequently release the piezokinetic elements 210 as the rotating collar 200 rotates. In the illustrated embodiment, structural projections 240 extend radially inwardly from the inner surface of the rotating collar 200. The inner surface of the rotating collar 200 is insulated from the exterior environmental conditions. Referring now to FIG. 5, this is accomplished by sealing the junctions of the exterior housing 205 and rotating collar 200 through the use of Oldham rings, o-rings, elastomeric members, wet mateable connectors, or other methods of environmentally sealing rotating assemblies known in the art. The engagement between the piezokinetic elements 210 and the rotating collar 200 may be through physical contact or through magnetic coupling in the absence of actual physical contact or a combination thereof.

In the embodiment illustrated in FIG. 2 the piezokinetic assembly is fixed. However, other embodiments may feature one or more dynamic piezokinetic assemblies engaging fixed structural projections. Also, neither the structural projections nor the piezokinetic assemblies are necessarily fixed. They both may be dynamic. If both are dynamic, the structural projections and the piezokinetic assemblies simply need to be displaced relative to the other. Thus they may both move in the same direction in the same plane, but at different rotational velocities.

With continued reference to FIG. 2, when rotating the rotating collar 200, structural projections 240 engage piezokinetic elements 210 as the structural projections travel about their arc of rotation. As the structural projections 240 engage and disengage the piezokinetic elements 210 as they pass, the interaction causes the piezokinetic elements 210 to bend and recoil. The recoil causes the piezokinetic elements 210 to vibrate or "ring down." As the piezokinetic elements 210 vibrate, they flex the electromechanical coupled material 255 affixed thereto causing the electromechanical coupled material 255 to generate an electrical charge. As used herein, the term "electromechanical coupled material" means a piezoelectric material, i.e., piezoceramics and piezopolymers, an electrostrictive material or any other ferroelectric material. In some embodiments a suitable electromechanical coupled material is a PZT ceramic. The electromechanical coupled material 255 may be in the form of a panel having a rectangular crossection or it may be formed in another shape. Rotating collar 200 may be turned in either direction to excite, or energize, the piezokinetic elements.

In the embodiment of FIG. 2, each of the piezokinetic elements 210 of the piezokinetic assembly 220 are engaged and disengaged by structural projections 240 coupled to the rotating collar 200. The simultaneous interaction of the piezokinetic elements 210 and the plurality of structural projections 240 cause the piezokinetic elements 210 to simultaneously vibrate and generate electrical charge. Preferably the recoil causes the piezokinetic elements 210 to vibrate at the desired resonance frequency to maximize the mechanical to electrical conversion, and without uncoordinated interference by the means used to excite the piezokinetic elements 210, the turning system causes a plurality of the piezokinetic elements 210 to simultaneously vibrate at or near resonance for maximum energy conversion. Rotating collar 200 may rotate in either direction to excite, or energize, the piezokinetic elements.

The electrical charge caused to accrue through the piezokinetic assembly 220 may be rectified and stored in a battery or other energy storage device directly or indirectly coupled thereto for future use or directly applied to power an electrical device. In other embodiments, the piezokinetic assembly 220 may be configured to energize the piezokinetic elements 210 in groups, in a particular sequence, or simultaneously, depending on the environment and power generation requirements.

Figure 3:
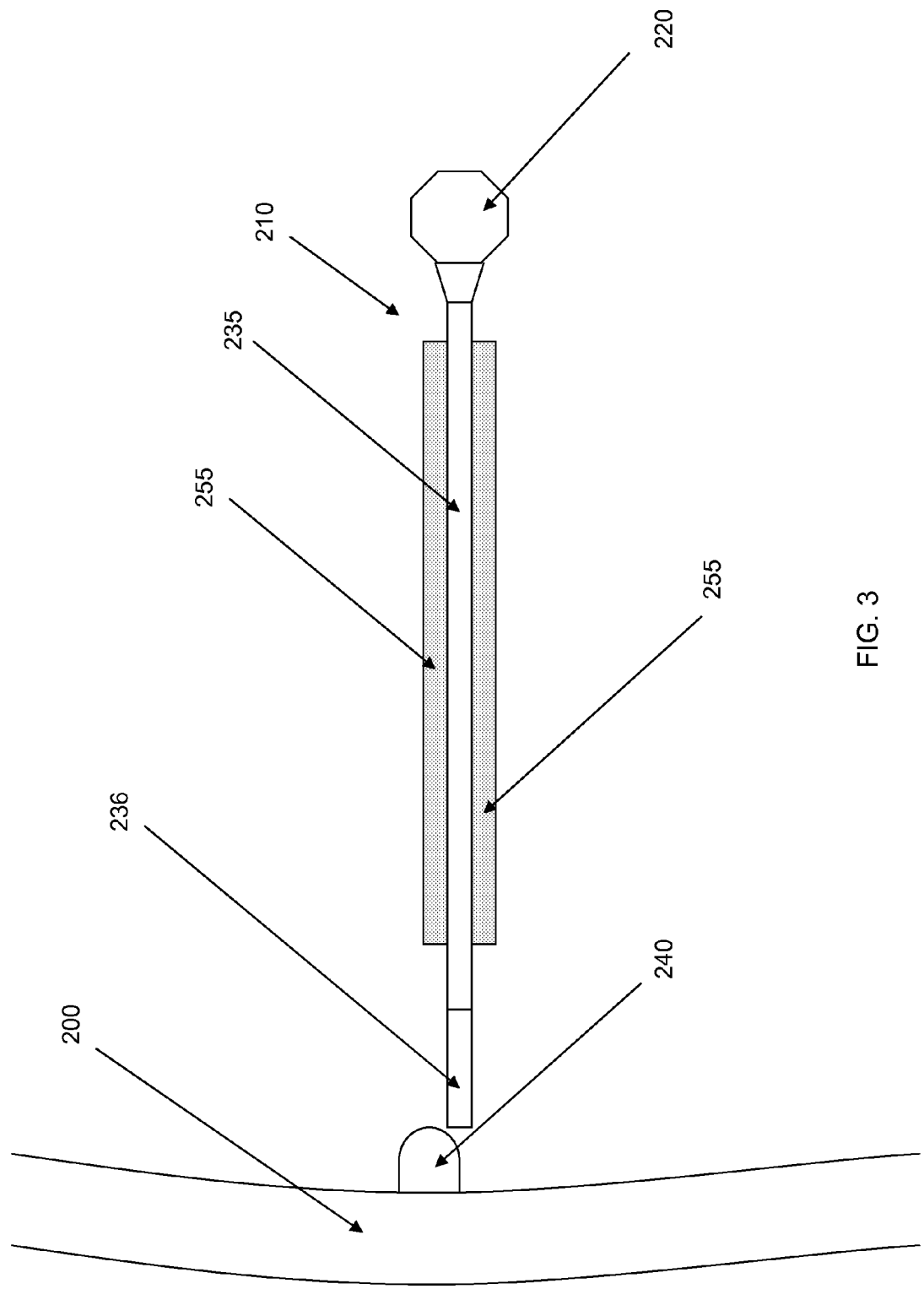
FIG. 3 illustrates an exemplary embodiment of a piezokinetic element used to form a piezokinetic assembly.

Referring now to FIG. 3 which illustrates a single piezokinetic element 210 of the embodiment of the piezokinetic assembly 220 of the type shown in FIG. 2, the piezokinetic assembly 220 features a plurality of piezokinetic elements 210 (one shown) rigidly attached to a center structure. Preferably the piezokinetic elements 210 of the piezokinetic assembly 220 incorporate a layered structure. The structure features a semi-rigid central layer 235 having at least one electromechanical coupled panel 255 incorporated therewith. "Incorporated" as used herein means, bonded, sputtered, chemically etched or otherwise affixed to or integrated with. The central layer 235 extends beyond the electromechanical coupled panel 255 exposing the edge of the semi-rigid central layer 235 as a striker element 236. Preferably, the central layer 235 and or the exposed striker element 236 is constructed of a metallic or ceramic structure, however, plastics, rubber or other rigid, yet resilient materials may be used. The striker element 236 may be a separate structure bonded to the central layer 235 and is not required to be the same material as the semi-rigid central layer 235.

In one embodiment the piezoelectric material is a PZT ceramic, however, other piezoelectric materials may be used including PMN ceramics, piezopolymers, single crystal materials or other materials that convert kinetic energy into electrical charge. As shown in the embodiment illustrated in FIG. 3 the piezokinetic element 210 may incorporate piezoelectric panels 255 bonded to one or both sides of the semi-rigid central layer 235.

The striker element 236 is disposed such that the structural projections 240 of the rotating collar 200 engage the piezokinetic element 210 when the rotating collar 200 is turned. In an alternate embodiment the structural projections 240 are attached to a fixed structure and the piezokinetic assembly 220 is dynamic, rotating or moving in a lateral plane. It is preferable that the engagement between striker element 236 and projections 240 cause the piezokinetic element 210 to vibrate at its natural resonant frequency in order to induce the piezoelectric panels 255 to generate maximum electrical charge. Accordingly, in at least one embodiment, striker element 236 and structural projections 240 are disposed relative to each other such that the tip of striker element 236 engages structural projections 240.

Figure 4:
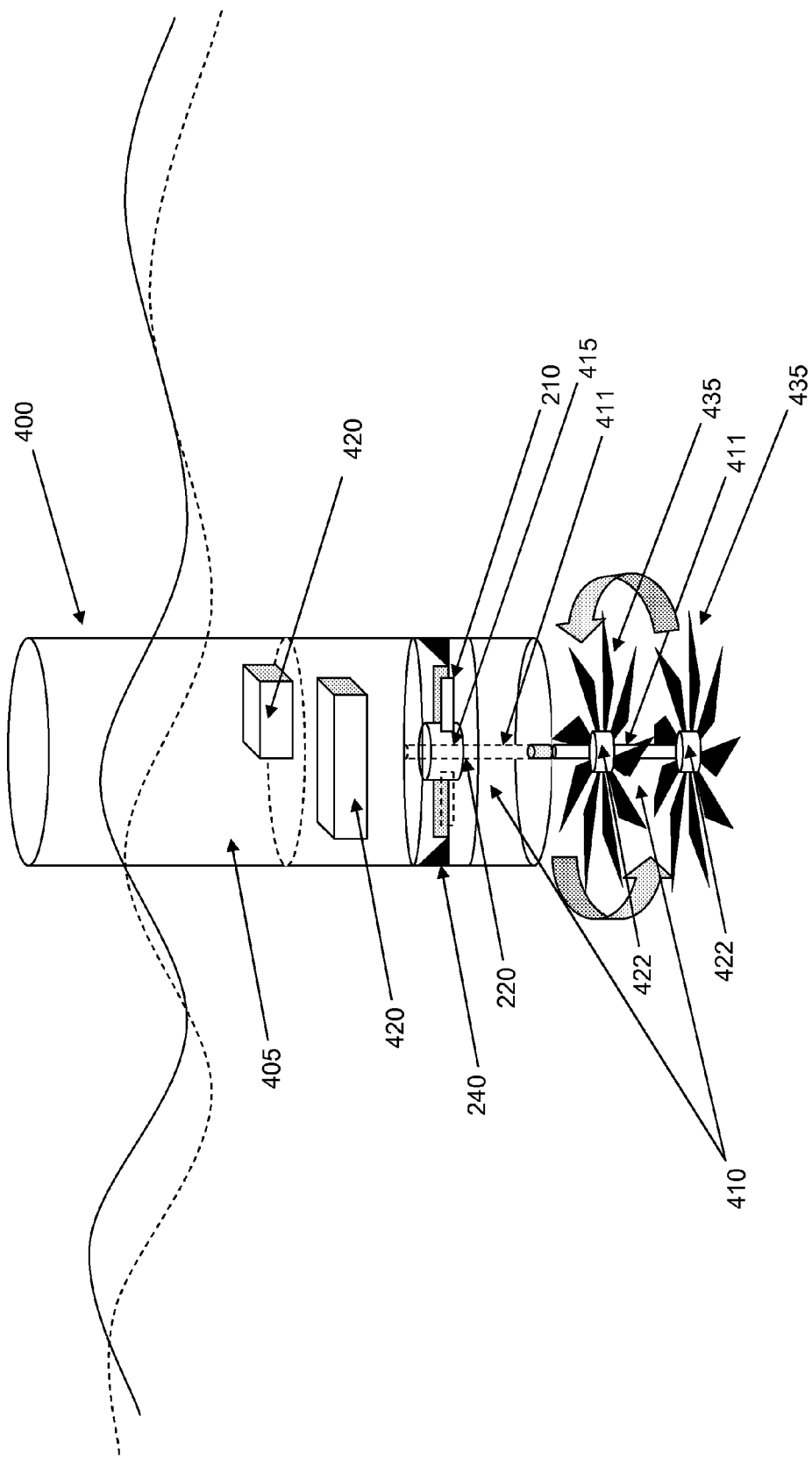
FIG. 4 illustrates an exemplary embodiment of a wave energy conversion device with a structural housing employing a rotating hub assembly.

FIG. 4 illustrates yet another example embodiment of a system for converting kinetic wave energy from a dynamic fluid into electrical power. When introduced to a dynamic fluid medium the wave action of the fluid medium rotates a piezokinetic assembly 220 coupled to the dynamic fluid through a dynamic assembly 410.

The system illustrated in FIG. 4 features a sealed structural housing 405 containing a piezokinetic assembly 220 having a plurality of piezokinetic elements 210. Piezokinetic assembly 220, drive shaft 411, second hub 422 and blades 423 combine to form dynamic assembly 410. The blades 435 of the dynamic assembly 410 may incorporate variable, or varying pitch. The system also features an electronics package 420 electrically coupled to said piezokinetic assembly 220. The electronics package 240 may include a battery or energy storage device such as a capacitor, or it may be in the form of any electronic or electro-mechanical or electro-optical circuit that uses electrical power. Other examples are lights, sensors, antenna, transmitters, receivers, gyro stabilizers, laser or other devices.

Piezokinetic assembly 220 is rigidly attached to a second hub 422 through drive shaft 411, the second hub 422 having a plurality of blades 435 attached to its surface adapted to couple with a dynamic fluid medium. The piezokinetic assembly 220 is adapted to rotate about the rotational axis of drive shaft 411. The system features a fixed housing 405 having at least one structural projection 240 on its interior surface. The housing 405 surrounds the piezokinetic assembly 220 in a substantially watertight structure such that the piezokinetic assembly's center hub 415 is disposed substantially at the center of the housing 405 and the drive shaft 411 and second hub 422 protrude from the housing to allow direct exposure to the dynamic fluid medium. The substantially watertight structure separates the piezokinetic assembly 220 and electronics package 420 or module from the housing's exterior environment. Drive shaft 411 protrudes through the housing 405 via an opening having a substantially watertight seal 415, simultaneously preventing moisture from entering the interior of the housing while allowing rotation of the drive shaft 411 with minimal friction.

When the system 400 is introduced to a dynamic fluid medium, the system floats in the medium with the weight bias of the system distributed such that the blades 435 of the dynamic assembly 410 are submerged in the fluid medium or alternative the weight bias of the system 400 can be distributed such that both it and the blades of the dynamic assembly 410 are both submerged in the fluid medium. If the system has negative or neutral buoyancy the distribution may be such that the blades are carried above the structural housing 405 of the system 400 as it floats. The wave energy couples with the blades 435 of the dynamic assembly 410 causing a resulting displacement in the rotating assembly 410 contained therein. Specifically, immersion of the blades 435 of the second hub in a dynamic fluid medium couples the second hub to the dynamic fluid medium, rotating the second hub and causing a corresponding rotation of the piezokinetic assembly 220. The rotation of the piezokinetic assembly 220 causes the edge of a piezokinetic element 210 to engage the edge of the structural projections 240 of the housing causing the at least one electromechanical coupled panel to vibrate causing the electromechanical coupled material to generate an electrical charge.

The displacement of the dynamic assembly 410 vibrates the piezokinetic assembly 220 causing the plurality of electromechanical coupled elements 210 to simultaneously flex and generate charge that can be rectified to supply electrical power for the electronics package 420.

With reference to FIG. 5 with continued reference to FIG. 2, FIG. 5 shows yet another embodiment of a wave energy conversion device with a structural housing employing a rotating hub. This embodiment is a variation of the wave energy device illustrated in FIG. 2.

The embodiment illustrated in FIG. 5 has a sealed housing structure 205 having a rotating collar 200 coupled thereto, the rotating collar 200 is disposed around the sealed housing and coupled to the housing such that the collar 200 is free to rotate. The rotating collar 200 features blades 230 disposed on its surface, these blades are configured in size, shape and angle to couple with a fluid medium.

Figure 6:
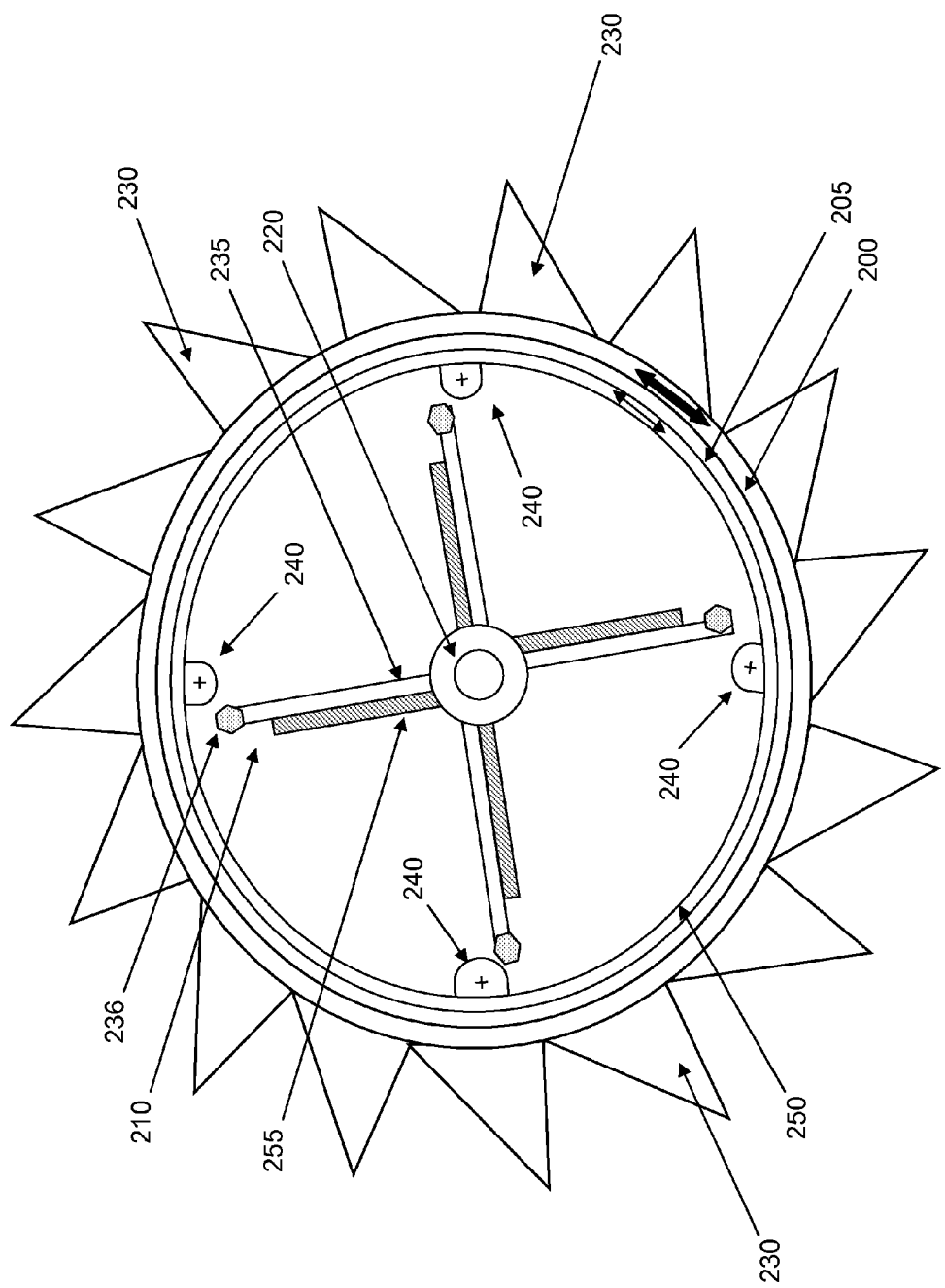
FIG. 6 illustrates the example embodiment of the kinetic wave energy conversion device of FIG. 5 showing the piezokinetic assembly and interior collar.

Referring now to FIG. 6, with continued reference to FIG. 5, the exterior housing 205 contains an interior sleeve structure 250 having a plurality of structural projection 240 on its interior surface. The interior sleeve structure 250 is disposed within the exterior housing 205, and is magnetically coupled to the rotating collar 200, through the wall of the housing structure 205, such that rotation of the rotating collar 200 causes a corresponding rotation of the interior sleeve 250. A piezokinetic assembly 220 disposed inside the interior sleeve structure 250 includes a plurality of piezokinetic elements 210 projecting therefrom rigidly attached to a center structure. Preferably, the semi-rigid piezokinetic elements 210 of the piezokinetic assembly 220 incorporate a layered structure. The structure features a semi-rigid central layer 235 having at least one electromechanical coupled element 255 bonded or affixed thereto.

Figure 7:
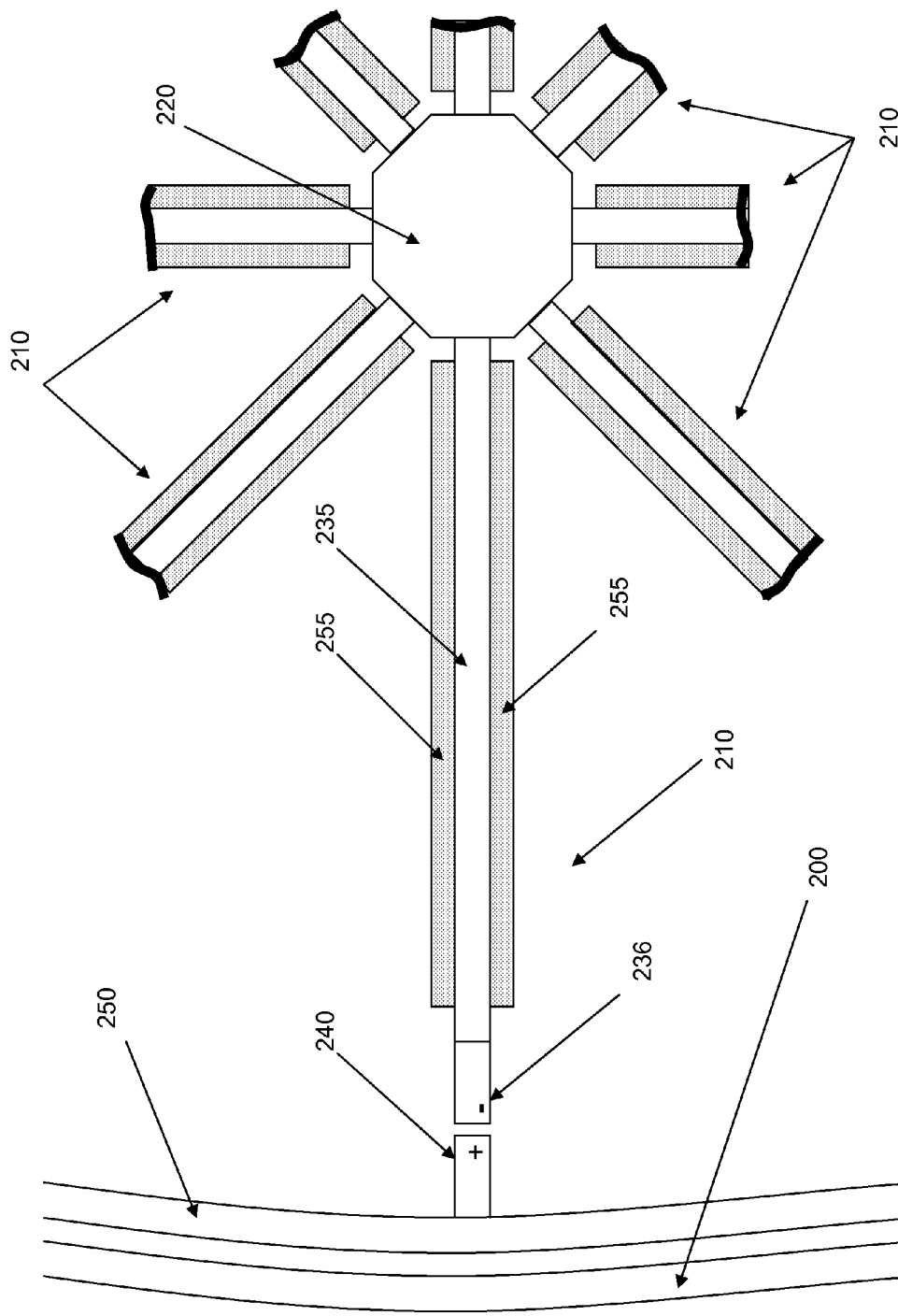
FIG. 7 illustrates an example embodiment of a wave energy conversion device of FIG. 6 wherein the piezokinetic assembly is magnetically coupled to the structural projections of the interior sleeve structure.

Referring now to FIG. 7, with continued reference to FIGS. 5 and 6, each piezokinetic element may incorporate electromechanical coupled materials 255 on each side. The semi-rigid central layer 235 extends beyond the electromechanical coupled material 255 exposing the edge of the strike layer as a striker element 236. Preferably, the central layer 235 and or the exposed striker element 236 is constructed of a metallic or ceramic structure, however, plastics, rubber or other rigid, yet resilient materials may be used.

The striker element 236 may be a separate structure bonded to the central layer 235 and is not required to be the same material as the semi-rigid central layer 235. The striker element 236 can take the form of a cap or tip that has a magnetic attraction such as steel or can be made of a magnetic material such as neodymium cobalt or iron at the tip.

In a preferred embodiment the striker element 236 is rounded at it's outer tip. The inner rotating sleeve structure 250 incorporates a set of structural projections 240 on its inner surface constructed of a magnetic material biased to the opposite polarity of the striker element, however in other embodiments the structural projections 240 may be biased to have the same polarity as the striker element 236.

When introduced into a dynamic fluid medium, the wave energy from the fluid couples with the blades 230 on the rotating collar 200 and causes the rotating collar 200 to rotate. The inner rotating sleeve 250 is free to rotate and counter rotate based on the blades fluidic coupling. The rotating collar 200 is coupled, preferably magnetically, to the interior sleeve structure 250 having a plurality of structural projections 240 on its interior surface. The exterior housing structure 205 also contains a piezokinetic assembly 220 centered in the housing 205. The piezokinetic assembly 220 features a plurality of piezokinetic elements 210, attached thereto and projecting outward from a center axis. The inner surface of the interior sleeve 250 a plurality of structural projections 240, which are disposed such that they engage the piezokinetic elements 210 when the rotating ring 200 rotates relative to the piezokinetic assembly 220. In the instant embodiment the engagement between the piezokinetic elements 210 and the structural projections 240 of the interior sleeve 250 is through magnetic coupling.

Referring now to FIG. 6 with continued reference to FIG. 5 when the rotating collar 200 is turned by the kinetic energy of the dynamic fluid coupled thereto, the interior sleeve 250, rotates. The structural projections 240 of the interior sleeve 250 engage and disengage piezokinetic elements 210 as the structural projections 240 travel about their arc of rotation.

FIG. 7 illustrates a detailed view of the piezokinetic element 210 of the piezokinetic assembly 220 and the interior sleeve 250 configured to magnetically couple. Referring now to FIG. 7, with continued reference to FIG. 5 and FIG. 6, the structural projections 240 engage and disengage the piezokinetic elements 210 through magnetic coupling. The striker portion 236 of the piezokinetic panel 210 and the structural projections 240 are set to a predetermined magnetic/charge bias. In a preferred embodiment both the piezokinetic elements 210 and the structural projections 240 have opposing magnetic bias, (one is biased (+) and the other has a (−) bias) such that the tip or striker portion 236 of the piezokinetic element 210 and the structural projection 240 attract each other. As the piezokinetic element's 210 striker element 236 and structural projection 240 pass in close proximity of each other, the magnetic interaction of the attractive force of opposing biased ends causes the piezokinetic elements 210 to bend and recover or recoil. The bending/recoil causes the piezokinetic elements 210 to vibrate or "ring down." As the piezokinetic elements 210 vibrate, they flex the electromechanical coupled material 255 they possess causing the electromechanical coupled material 255 to generate an electrical charge. In this embodiment the rotating ring 200 is coupled to the interior sleeve 250 and may be turned in either direction while the piezokinetic assembly 220 is fixed or rotates at a different velocity than the interior sleeve 250.

In the example embodiment of FIGS. 5, 6, and 7 each of the piezokinetic elements 210 of the piezokinetic assembly 220 are engaged and disengaged by structural projections 240, ultimately coupled to the rotating ring 200, without actually touching. This feature facilitates reduction in the frictional forces associated with the rotating assemblies substantially promoting enhanced efficiency. The number of piezokinetic elements 210 that may be incorporated and energized simultaneously is not a limiting factor of this invention. The simultaneous interaction of the piezokinetic elements 210 and the plurality of structural projections 240 cause the piezokinetic elements 210 to simultaneously generate electrical charge as they vibrate. As the piezokinetic elements 210 of the piezokinetic assembly 220 couple with the structural projections 240, without actually touching the structural projections 240, the amount of time that the plurality piezokinetic elements vibrate at or near their resonance frequency is maximized, thus maximizing efficiency of the system.

In yet another embodiment a number of inner piezokinetic assemblies 220 may be vertically stacked within the interior of the structural housing 205 each piezokinetic assembly 220 having a corresponding rotation collar assembly 200 or each piezokinetic assembly may be energized by a single rotating collar assembly 200. In yet another embodiment incorporating a configuration similar to that of illustrated in FIG. 4, a plurality of piezokinetic assemblies 220 may be coupled to a single hub or a plurality of hubs through a common drive shaft 411.

The electrical charge may be stored in a battery or other energy storage device directly or indirectly coupled thereto for future use, or the electrical charge may be directly applied to power an electrical device, such as a light, radio transmitter, sensor or heater.

Figure 8:
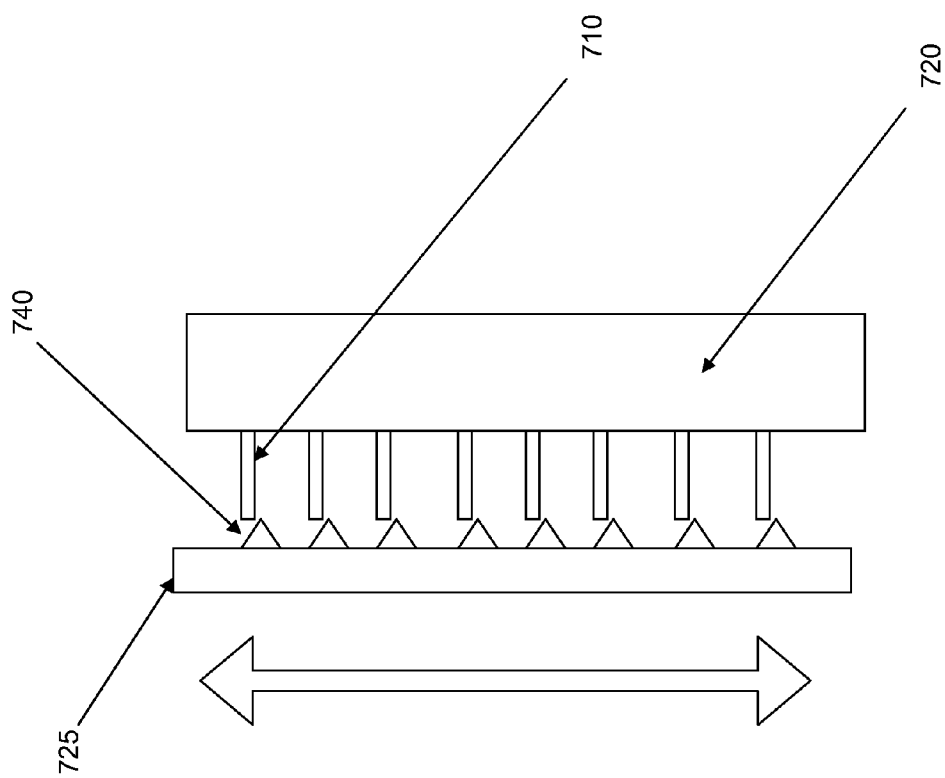
FIG. 8 illustrates an exemplary embodiment of an inertial kinetic wave energy conversion system for lateral motion incorporated into a buoy with a structural housing employing a sliding dynamic assembly.

In yet another embodiment the system for wave energy conversion may be configured to generate power based on lateral displacement. Referring now to FIG. 8, which illustrates a wave energy conversion apparatus 700 configured to generate electrical charge based on the inertia from lateral displacement of the piezokinetic assembly relative to a dynamic assembly.

Figure 9:
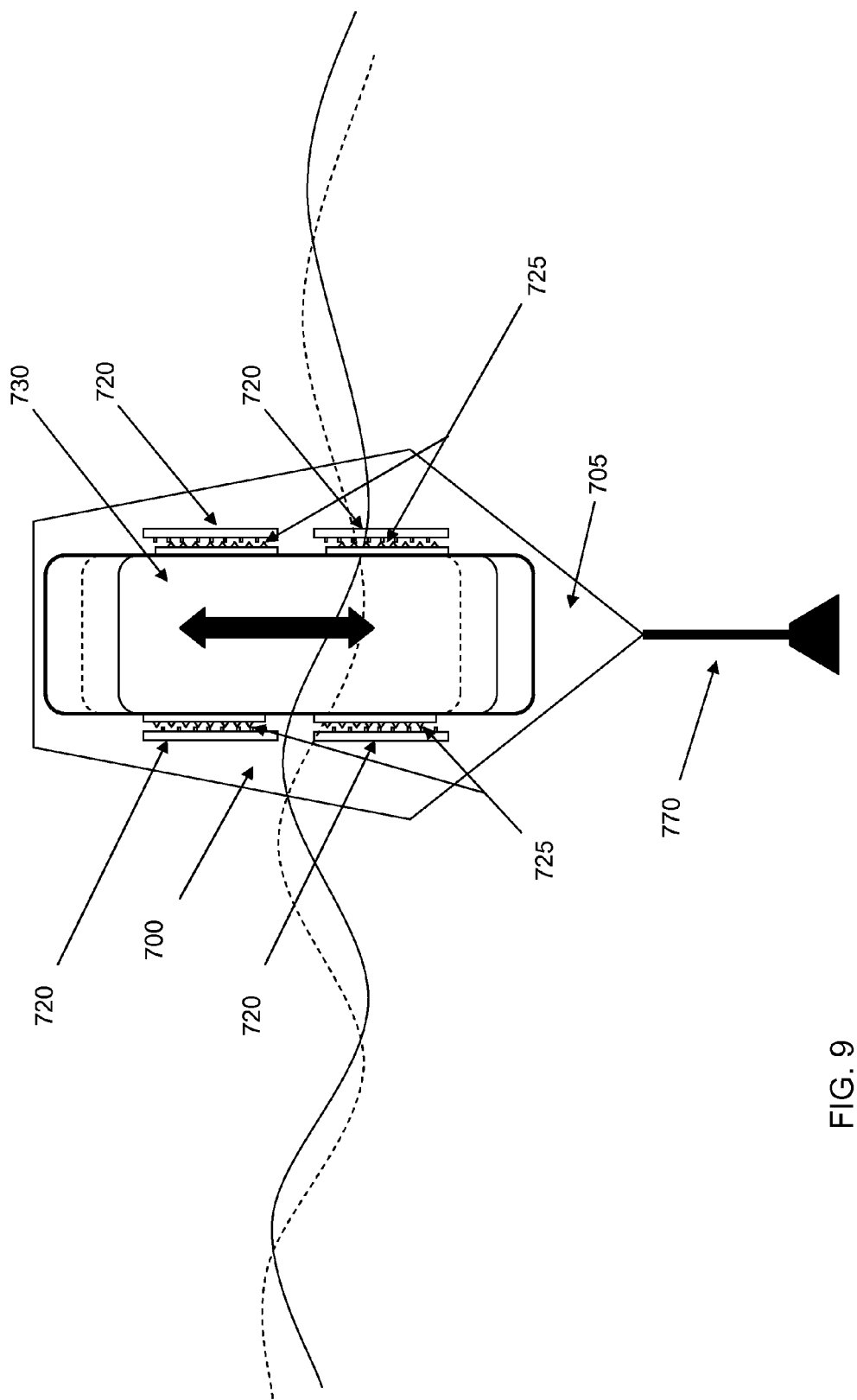
FIG. 9 illustrates a close up view of the dynamic assembly and piezokinetic assembly configured to convert lateral motion into electrical power employed in the exemplary embodiment of FIG. 8.

Referring now to FIG. 9, which illustrates a piezokinetic assembly employed in the exemplary lateral displacement embodiment, and with continued reference to FIG. 8, the system 700 features a structural housing 705 containing a piezokinetic assembly 720 having a plurality of electromechanical coupled elements 710. Preferably, ballast or a weight bias is attached or incorporated to the structural housing 705 to ensure that the system 700 generally maintains the desired orientation in the fluid medium. The system features a dynamic assembly 730, coupled to the piezokinetic assembly 720 through at least one strike layer 725.

The strike layer 725 of the dynamic assembly 730 couples to the piezokinetic assembly 720 through a plurality of structural projections 740 attached to said dynamic assembly 730. The piezokinetic assembly 720 and the structural projection 740 of the strike layer 725 may be coupled by physical contact or may be magnetically coupled. The system also features an electronics package (not shown) or module coupled to the piezokinetic assembly 720. The electronic module may incorporate a battery apparatus to store the generated power, or electronics which consume the electrical power generated by the piezokinetic assembly 720.

When the wave energy couples with said the structural housing 705, the vertical motion of the wave causes a resulting displacement of the dynamic assembly 730 contained therein. The displacement of the dynamic assembly 730, relative to the piezokinetic assembly 720 causes the structural projections 740 attached thereto through the striker layer to couple with the piezokinetic elements 210 of the piezokinetic assembly 720 thereto vibrating said piezokinetic assembly 720 causing a plurality of the piezokinetic elements 210 to simultaneously flex and accrue charge for conversion into electrical power.

Figure 10:
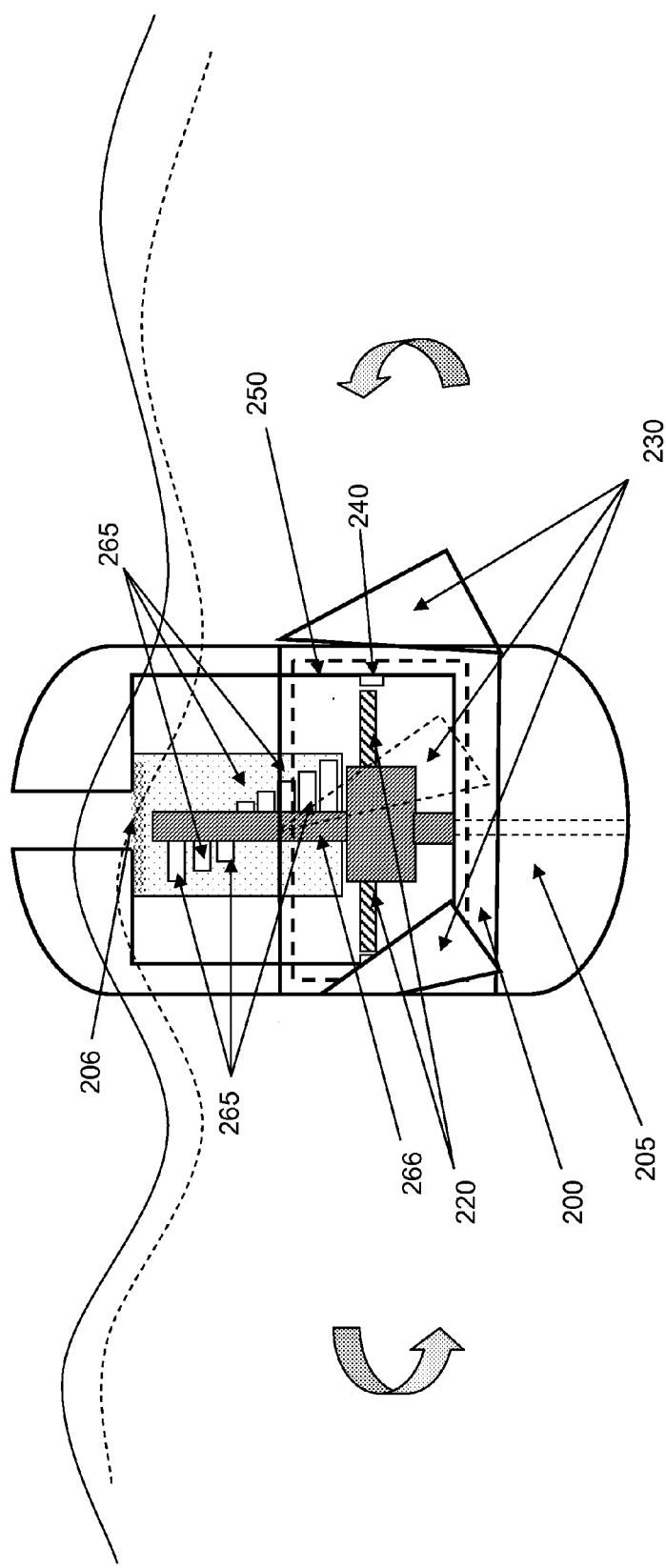
FIG. 10 illustrates an exemplary embodiment of a wave energy conversion device with a structural housing incorporating a stabilization structure to minimize the inertial effect of the rotating collar assembly on the structural housing.

FIG. 10 illustrates yet another exemplarily embodiment of a wave energy conversion device with a structural housing 205 incorporating an open stabilization structure 206 to minimize the inertial effect of the rotating collar assembly 200 on the structural housing 205. As shown in FIG. 10 the wave energy conversion device has a rotating ring 200 magnetically coupled to an inner sleeve 250 through the wall of the structural housing 205. The inner sleeve has a plurality of structural projections 240 disposed thereon and when the apparatus is placed in the dynamic fluid medium the fluid couples with the device through the blades 230 of the rotating collar 200 resulting in a corresponding rotation of the inner sleeve 250 causing the structural projections 240 disposed thereon to engage and disengage the piezokinetic assembly 220 causing the piezokinetic assembly 220 to vibrate and generate and accrue electrical charge. When the rotating collar 200 turns, the entire housing structure 205 will also attempt to move in the rotational direction of the collar 200 because of inertial forces transferred to the housing structure 205 from the rotating collar 200 through friction between dynamic assemblies of the apparatus and static assemblies. This problem is may be addressed by manipulating the mass ratios of the static and dynamic assemblies, the physical structure of the housing or a combination of both.

The exemplary embodiment illustrated in FIG. 10 incorporates a housing structure 205 featuring a stabilization structure in the form of a secondary internal fluidic cylinder 206 that is filled with the liquid from the external environment. The chamber includes a plurality of liquid couplers or flanges 265 that are rigidly disposed on a shaft 266 that is rigidly coupled to the housing structure 205. In the illustrative embodiment the flanges 265 are crescent shaped with at least one coupler 265 disposed to couple with the liquid of the cylinder and stabilize the housing structure 205 when the rotating collar transmits forces to the housing structure 205 during clockwise rotation of the rotating collar 200, and at least one coupler 265 disposed to couple with the liquid of the cylinder and stabilize the housing structure 205 during counter-clockwise rotation of the rotating collar 200. However, flanges of other shapes may be employed. The flanges 265 couple the liquid of the secondary internal fluidic cylinder 206 with the housing structure 205 and generate a force on the housing structure 205 in the opposite direction of the rotating collar 200 sufficient to retard the housing structure's rotation relative to the collar 200 and minimize any energy losses due to the housing structure 205 rotating in the same direction, at the same rotational rate, as the rotating collar 200.

This energy management feature maximizes the energy transfer to the piezokinetic assembly from the inner sleeve 250 coupled to the rotating collar 200 maximizing the efficiency of the displacement of the rotating collar 200 relative to the housing structure 205 and the static assemblies 220 contained therein. This also allows the system to convert kinetic wave energy into electrical charge with minimal lose due to poor kinetic energy management.

Figure 11:
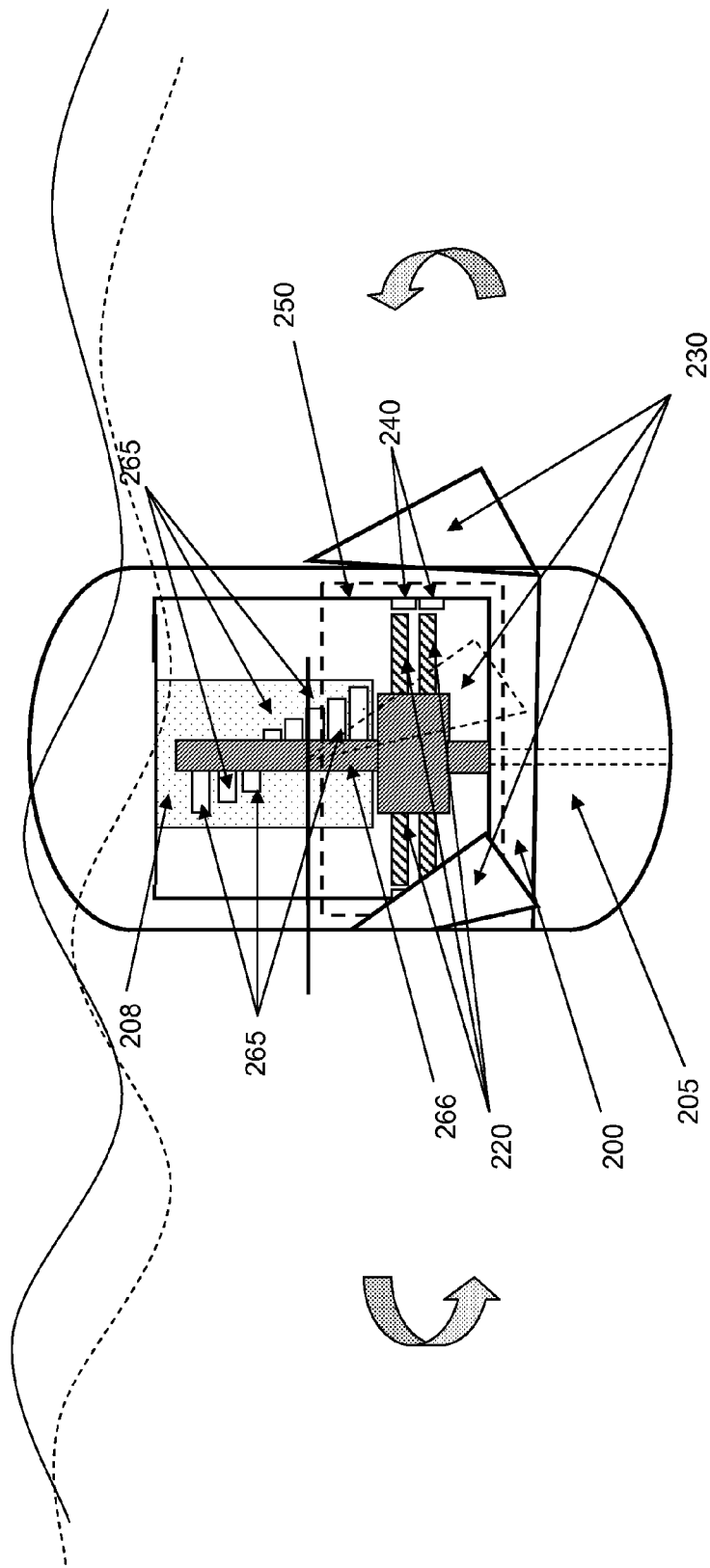
FIG. 11 illustrates an exemplary embodiment of a wave energy conversion device with a structural housing incorporating a sealed stabilization structure to minimize the effect of the moment of inertia of the rotating collar assembly on the structural housing and a plurality of vertical stacked piezokinetic assemblies.

FIG. 11 illustrates yet another embodiment of a wave energy conversion device with a structural housing 205 incorporating a sealed stabilization structure 208 to minimize the inertial effect of the rotating collar assembly 200 on the structural housing 205.

The stabilization structure featured in this embodiment functions on similar principles of the embodiment of FIG. 10, with the exception that the stabilization structure 208 is in the form of a sealed secondary internal fluidic cylinder. The sealed fluidic cylinder is self-contained and may be filled with a selected fluid or gas for buoyancy considerations. The flanges 265 are rigidly attached to the housing structure 205 through a shaft 266 or other structure and couple the housing structure 205 to the internal fluid contained within the cylinder to provide an opposing force to counter the tendency for the structural housing 205 to turn in the direction of the rotation of the rotating collar 200.

The embodiment illustrated in FIG. 11 also features a plurality of stacked piezokinetic assemblies 220 coupled to a plurality of structural projections 240 coupled to the inner sleeve 250. This configuration multiplies the power generated by the wave energy coupler by a significant amount.

Figure 12:
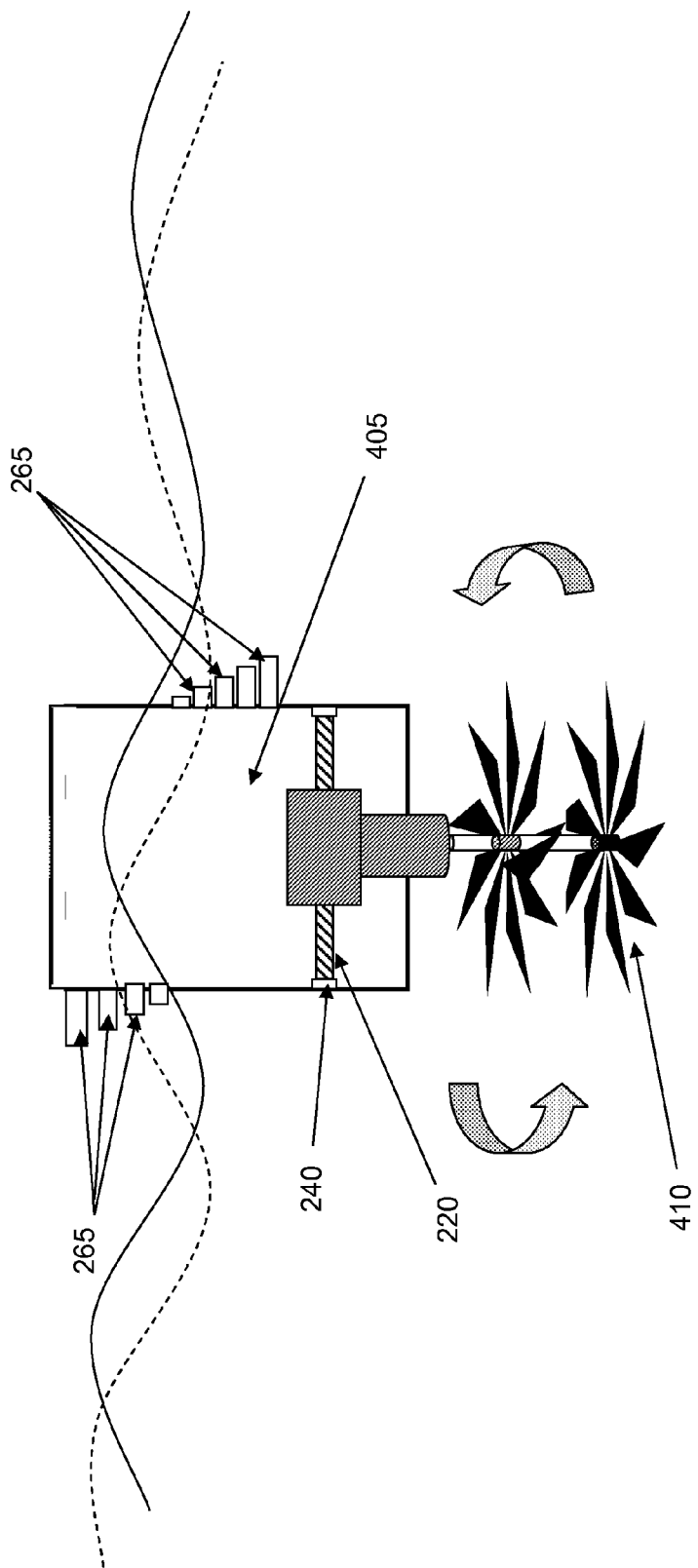
FIG. 12 illustrates an exemplary embodiment of a wave energy conversion device with a structural housing employing a rotating hub assembly and stabilization structure to minimize the effect of the inertia of the rotating hub assembly on the structural exterior housing, inner sleeve and associated projections.

FIG. 12 illustrates an example embodiment of a wave energy conversion device with a structural housing 405 employing a rotating hub assembly 410 and stabilization structure to minimize the effect of the inertia of the rotating hub assembly 410 on the structural housing 405. This embodiment operates to convert kinetic wave energy into electrical charge largely similar to the operation of the device of FIG. 4, but incorporates flanges 265 on the outer surface of the structural housing 405. The flanges 265 couple with the exterior environment and stabilize the structural housing 405 retarding the structural housings rotation relative to the dynamic assembly 410 maximizing the kinetic energy transfer to the piezokinetic assembly 220 and the ultimate conversion of the kinetic energy from the vibrating piezokinetic assembly 220 into electrical charge.

In yet another embodiment the invention resides in a system for converting kinetic wave energy from a dynamic fluid into electrical power this system includes a structural housing containing a piezokinetic assembly having a plurality of piezokinetic elements, and a dynamic assembly, coupled to the piezokinetic assembly, as well as an electronics module coupled to the piezokinetic assembly. When the exposed to the dynamic fluid medium, the dynamic fluid medium's wave energy couples with the structural housing causing a resulting displacement of the dynamic assembly contained therein. The displacement of the dynamic assembly relative to the piezokinetic assembly causing a plurality of the piezoelectric elements to simultaneously flex, generating an electrical charge.

In yet another embodiment the invention resides in a method of converting kinetic wave energy into electrical energy. The method includes coupling an exterior assembly to a dynamic fluid medium wherein the kinetic energy of the dynamic fluid medium displaces the exterior assembly and coupling the exterior assembly to an interior assembly such that the displacement of the exterior assembly results in a corresponding displacement of the interior assembly. The method also includes coupling the interior assembly to a piezokinetic assembly such that the movement of the interior assembly vibrates the piezokinetic assembly simultaneously flexing a plurality of piezokinetic elements producing an electrical charge.

In yet another embodiment the invention resides in a method of converting kinetic wave energy into electrical energy, including coupling an exterior blade assembly to a dynamic fluid medium wherein the kinetic energy of the dynamic fluid medium rotates the exterior blade assembly. The method also includes coupling the exterior blade assembly to an interior rotating assembly such that the rotation of the exterior blade assembly rotates the interior assembly. The method also includes coupling the interior assembly to a piezokinetic assembly such that the rotation of the interior assembly vibrates the piezokinetic elements of the piezokinetic assembly flexing electromechanical coupled material bonded the piezokinetic panel producing an electrical charge.

VI. INDUSTRIAL APPLICABILITY

The embodiments of the invention are scalable, stackable and can be manufactured of durable lightweight plastics, ceramics, or metallic materials. The embodiments of the invention can be coupled into systems or arrays of power conversion devices from large scale to micro scale power generation. The individual power units can provide a small fraction of a watt to hundreds of watts of power or more continuously, depending upon the ambient conditions.

Although specific example embodiments have been illustrated and described herein, those of ordinary skill in the art appreciate that other variations, aspects, or embodiments may be contemplated, and/or practiced without departing from the scope or the spirit of the appended claims.

The invention claimed is:

1. An apparatus for converting fluid wave energy to electrical energy comprising:
   a housing structure having a rotating collar coupled thereto, said rotating collar being disposed around said housing and coupled to said housing such that said collar is free to rotate, said rotating collar having blades disposed on its surface, said blades being configured to couple with a fluid medium;
   an interior sleeve structure having at least one structural projection on its interior surface, said interior sleeve structure being disposed within said housing and being coupled to said rotating collar, such that rotation of said rotating collar causes a corresponding rotation of the interior sleeve the structural projections or both;
   a piezokinetic assembly disposed inside said interior sleeve structure having at least one piezokinetic element projecting therefrom, said piezokinetic assembly being disposed in said housing such that upon rotation of said interior sleeve, the structural projections, or both, the at lease one piezokinetic element engages and disengages the structural projections causing said at least one piezokinetic element to vibrate causing said piezoelectric material to generate an electrical charge.

2. The apparatus of claim 1 wherein said rotating collar and said interior sleeve structure are magnetically coupled through said housing wall.

3. The apparatus of claim 1 wherein said electrical charge produced by said piezoelectric material is stored in an energy storage device.

4. The apparatus of claim 1 wherein said housing structure has at least one structural projection adapted to couple with a fluid medium to offset the inertial forces transferred to said housing structure by said rotating collar.

5. The apparatus of claim 2 wherein said piezokinetic assembly comprises a plurality of piezokinetic elements projecting radially from a center hub, each said piezokinetic element comprising a semi rigid element and a piezoelectric element attached to the semi rigid element, said piezoelectric element being disposed such that a portion of said semi rigid layer is exposed.

6. The apparatus of claim 2 wherein said piezokinetic elements of said piezokinetic assembly have a metallic striker element.

7. The apparatus of claim 2 wherein said piezokinetic elements of said piezokinetic assembly have a regular trapezoidal planar geometry.

8. The apparatus of claim 2 wherein at least one structural projection of said interior sleeve structure is curvilinear.

9. The apparatus of claim 1 wherein said housing structure is non-porous to the external fluid medium.

10. An apparatus for converting and storing wave energy comprising:
    a piezokinetic assembly having a central hub with plurality of piezokinetic elements projecting therefrom, said piezokinetic assembly being rigidly attached to a second hub through a drive shaft, said second hub having a plurality of blades disposed on its surface said blades being adapted to couple with a dynamic fluid medium, said piezokinetic assembly being adapted to rotate about the axis of the drive shaft;
    a housing having at least one structural projection on its interior surface, said housing being disposed such that said housing surrounds said piezokinetic elements of said piezokinetic assembly such that said central hub is disposed proximate to the center of the housing and said drive shaft and second hub protrude from the interior of said housing;
    wherein immersion of said blades of said second hub in a dynamic fluid medium couples said second hub to said dynamic fluid medium, rotating said second hub and causing a corresponding rotation of said piezokinetic assembly, said rotation of said piezokinetic assembly causing the edge of said piezokinetic elements to engage the edge of said at least one structural projection of said housing causing said plurality of piezokinetic elements of said piezokinetic assembly to vibrate causing said piezokinetic elements to accrue electrical charges.

11. The apparatus of claim 10 further comprising an electronics package disposed in said housing.

12. The apparatus of claim 11 wherein said electronics package includes an energy storage device that stores electrical charge produced by said piezokinetic elements.

13. The apparatus of claim 10 wherein said fixed housing is substantially buoyant to a predetermined depth of deployment in a fluidic medium.

14. The apparatus of claim 10 wherein said piezokinetic assembly comprises a plurality of semi-rigid piezokinetic elements projecting radially from said center hub, each said piezokinetic element comprising a semi-rigid element and at least one electromechanical coupled element incorporated with said semi-rigid element, said electromechanical coupled element being disposed such that a portion of the semi-rigid element is exposed.

15. The apparatus of claim 10 wherein said fixed housing is non-porous to the external fluid medium.

16. The apparatus of claim 10 wherein said housing structure has at least one structural projection adapted to couple with a fluid medium and offset the inertial forces of said rotating piezokinetic assembly transferred to said housing structure.

17. The apparatus of claim 10 wherein each piezokinetic element comprises a metallic substrate with a electromechanical coupled material incorporated with at least one side.

18. The apparatus of claim 10 wherein each piezokinetic element comprises a plastic substrate with a electromechanical coupled material incorporated with at least one side.

19. The apparatus of claim 10 wherein at least one structural projection of said fixed housing's interior surface is curvilinear.

20. The apparatus of claim 10 wherein said housing comprises a plurality of piezokinetic elements rigidly attached to said fixed housing's interior surface projecting towards a central hub, and a plurality of structural projections are attached to said central hub coupled to said second hub through a drive shaft.

21. A method of converting kinetic wave energy into electrical energy using piezoelectric elements, said method comprising:
    coupling an exterior blade assembly to a dynamic fluid medium wherein kinetic energy of said dynamic fluid medium causes rotation of at least the exterior blade assembly;
    coupling said exterior blade assembly to an interior rotating assembly such that the rotation of the exterior blade assembly rotates said interior assembly;
    coupling said interior assembly to a piezokinetic assembly, the piezokinetic assembly including a plurality of piezokinetic elements such that the piezokinetic assembly vibrates responsive to rotation of the interior assembly thereby flexing an electromechanical coupled panel incorporated therewith accruing electrical charges.

22. A method of converting kinetic wave energy into electrical energy, said method comprising:
    coupling an exterior assembly to a dynamic fluid medium wherein said kinetic energy of said dynamic fluid medium moves the exterior assembly;
    coupling said exterior assembly to an interior assembly such that the movement of the exterior assembly results in a corresponding movement of said interior assembly;
    coupling said interior assembly to a piezokinetic assembly such that the movement of the interior assembly vibrates said piezokinetic assembly simultaneously flexing a plurality of piezokinetic elements accruing electrical charges.

23. The method of claim 22 wherein coupling an exterior assembly to a dynamic fluid medium further comprises coupling a plurality of blades to said dynamic fluid medium and coupling said plurality of blades to said piezokinetic assembly.

24. The method of claim 22 wherein each piezokinetic element comprises a layered structure having at least one layer of electromechanical coupled material.

25. The method of claim 22 wherein coupling said interior assembly to said piezokinetic assembly includes magnetically coupling said interior assembly to said piezokinetic elements.

26. The method of claim 23 wherein coupling said interior assembly and exterior assembly includes magnetically coupling exterior assembly to said interior assembly.

27. A system for converting kinetic wave energy from a dynamic fluid into electrical power said system comprising:
    a structural housing containing a piezokinetic assembly having a plurality of electromechanical coupled elements, and a dynamic assembly, coupled to said piezokinetic assembly;
    an electronics package coupled to said piezokinetic assembly;
    wherein said wave energy couples with said structural housing causing a resulting displacement of said dynamic assembly contained therein, the displacement of said dynamic assembly vibrating said piezokinetic assembly causing a plurality of said electromechanical coupled elements to simultaneously flex and accrue electrical charges.

28. An apparatus for converting fluid energy into electrical energy comprising:
    a piezokinetic assembly including a plurality of piezokinetic elements;
    a plurality of structural members corresponding to the plurality of piezokinetic elements;
    one of said piezokinetic elements of said piezokinetic assembly and said plurality of structural members moving relative to the other said piezokinetic elements of said piezokinetic assembly and said plurality of structural members such that the plurality of structural members engage said corresponding piezokinetic elements substantially simultaneously causing relatively undamped vibration of electromechanical coupled material incorporated with said piezokinetic elements.

29. The apparatus of claim 1 wherein said structural housing further comprises a stabilization structure to stabilize the apparatus when said rotating collar couples with the dynamic fluid medium and rotates.

30. The apparatus of claim 27 wherein said stabilization structure is a secondary fluidic cylinder comprising a plurality of flanges disposed to couple with the fluid contained in said secondary fluidic cylinder limiting the induced moment of rotation or translation imparted by said housing structure relative to said rotating collar.

31. The apparatus of claim 1 further comprising a plurality of piezokinetic assemblies disposed inside at least one cylinder shaped interior sleeve structure each said piezokinetic assembly having a plurality of piezokinetic elements projecting therefrom.

32. The apparatus of claim 1 wherein said blades disposed on said rotating collar have a variable pitch angle.

33. The apparatus of claim 10 wherein said fixed housing further comprises a stabilization structure to limit the rotation of the fixed housing when said blades of said second hub couple with the dynamic fluid medium and said second hub rotates.

34. The apparatus of claim 30 wherein said stabilization structure is at least one flange disposed to couple with the dynamic fluid medium and limit the rotation of said housing structure relative to said rotating collar.

35. The apparatus of claim 10 further comprising a plurality of piezokinetic assemblies disposed inside said fixed housing each said piezokinetic assembly having a plurality of piezokinetic elements projecting therefrom.

36. The apparatus of claim 1 wherein said blades disposed on said second hub assembly have a variable pitch angle.

37. A method of converting kinetic wave energy into electrical energy, said method comprising:
    coupling a first structural element to a dynamic fluid medium;
    coupling said first structural element to a plurality of second structural elements;
    coupling said plurality of second structural elements to a plurality of piezokinetic elements such that said second structural elements causes said plurality of piezokinetic elements to vibrate simultaneously at or near resonant frequencies each piezokinetic element including a piezoelectric element that generates an electrical charge responsive to vibration.

\* \* \* \* \*